United States Patent [19]
Mueller et al.

[11] Patent Number: 5,609,422
[45] Date of Patent: Mar. 11, 1997

[54] CRANKSHAFT BEARING

[75] Inventors: Robert Mueller, Moensheim; Johannes Wuest, Heilbronn, both of Germany

[73] Assignee: Dr. Ing.h.c.F Porsche AG, Weissach, Germany

[21] Appl. No.: 297,094

[22] Filed: Aug. 26, 1994

[30] Foreign Application Priority Data

Sep. 9, 1993 [DE] Germany .......................... 43 30 565.2

[51] Int. Cl.⁶ .................................................. F16C 17/22
[52] U.S. Cl. .......................... 384/278; 384/909; 384/294
[58] Field of Search .................................. 384/432, 278, 384/294, 905, 909

[56] References Cited

U.S. PATENT DOCUMENTS

| | | | |
|---|---|---|---|
| 4,074,512 | 2/1978 | Matt | 384/278 |
| 4,958,602 | 9/1990 | Hoeppner | 384/432 |

FOREIGN PATENT DOCUMENTS

| | | |
|---|---|---|
| 0038560 | 4/1984 | European Pat. Off. . |
| 0395130 | 3/1990 | European Pat. Off. . |
| 1299038 | 6/1962 | France . |
| 1262070 | 2/1968 | Germany . |
| 2257651 | 11/1982 | Germany . |
| 3135683 | 3/1983 | Germany . |
| 3426208 | 3/1986 | Germany . |
| 3442519A1 | 5/1986 | Germany . |

Primary Examiner—Lenard A. Footland
Attorney, Agent, or Firm—Evenson McKeown Edwards & Lenahan, PLLC

[57] ABSTRACT

A crankshaft bearing for internal-combustion engines is provided in an internal-combustion engine housing made of a light metal alloy and comprises a bearing bore for a crankshaft journal of a crankshaft. The crankshaft bearing is provided with a device that reduces the increase in bearing play that occurs during the operation of the internal-combustion engine. This device includes a compensating element which is provided between the bearing bore and the crankshaft journal and has a relatively high coefficient of expansion.

24 Claims, 3 Drawing Sheets

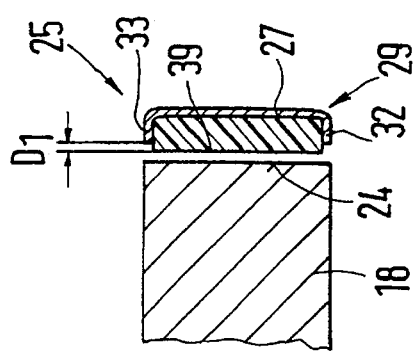
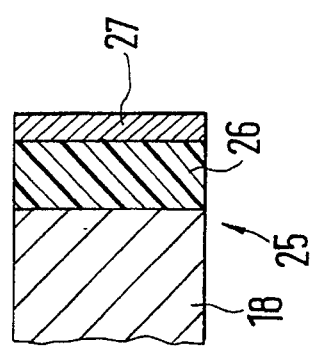
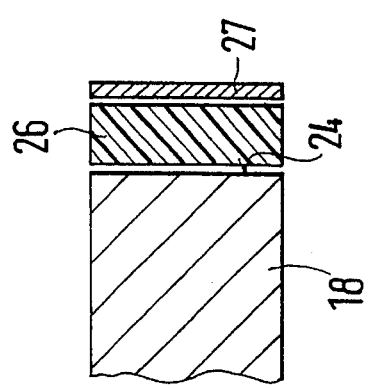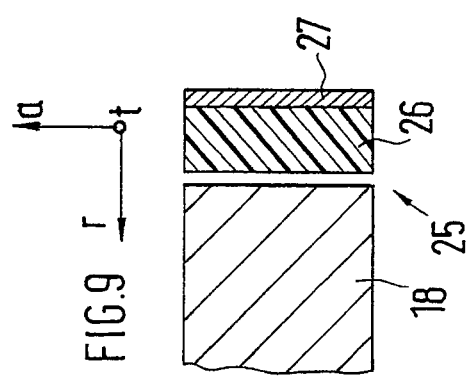
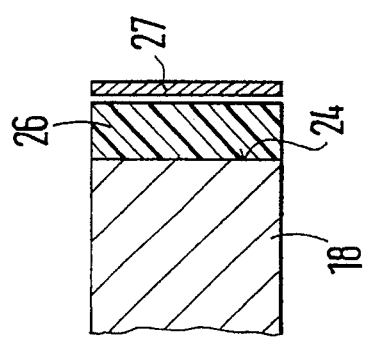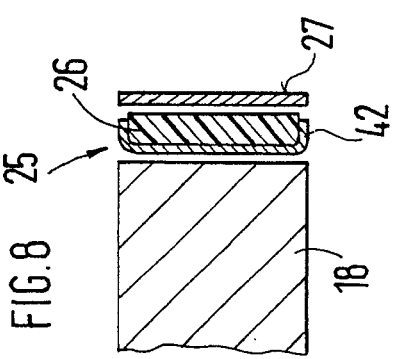
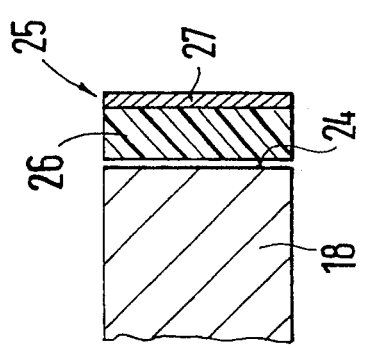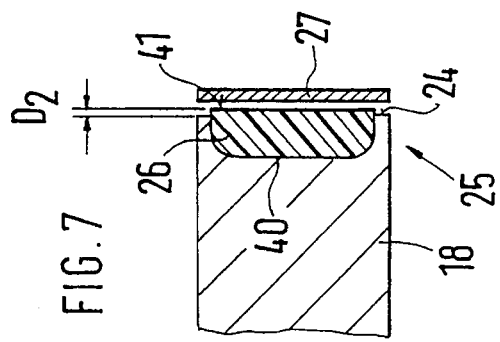

CRANKSHAFT BEARING

BACKGROUND AND SUMMARY OF THE INVENTION

The invention relates to a crankshaft bearing for internal combustion engines provided with a light metal alloy engine housing.

The amount of bearing play in internal combustion engine crankshaft bearings has a significant influence on the development and transmission of noise; it also influences the flow of lubricating oil through the bearing. Considerable increases in bearing play with rising temperature occur particularly in those internal combustion engines that have a housing made of a light metal alloy, whose crankshaft bearings receive a ferrous metal crankshaft. The different coefficients of expansion of light metal housings and ferrous metal crankshafts, depending on the temperature, cause the bearing bore of the respecting crankshaft bearing to increase, resulting in increased noise during engine operation.

To avoid this disadvantage, German Patent Document DE-OS 31 35 683 teaches casting a ferrous metal core in a bearing cover of a crankshaft bearing made of a light metal alloy, said core being formed by a strip extending transversely to the bearing cover and at a distance from the crankshaft journal. Since in this design the bore of the bearing cover expands as before, the desired noise reduction is not achieved with the means proposed.

In another known bearing for the crankshaft, disclosed in German Patent Document DE-34 26 208 C1, good results regarding noise reduction are achieved in a housing made of a light metal alloy; wherein the ferrous metal core cast in the light metal crankshaft bearing surrounds the crankshaft journal so that undesired increases in bearing play are avoided.

An object of the invention is to improve further a crankshaft bearing of an internal combustion engine with a housing made of a light metal alloy, for the specific purpose of simplifying a highly effective device for reducing bearing play and reducing its manufacturing cost.

According to the invention this goal is achieved by providing a device for reducing the increase in bearing play during operation of the engine, wherein the device is provided between a crankshaft journal and a bearing bore and includes an annular compensating element surrounding the crankshaft journal, said compensating element being made of a material with a relatively high coefficient of thermal expansion.

The primary advantages achieved with the invention consist in the fact that the device comprises a compensating element located between the bearing bore and the crankshaft journal and has a much greater coefficient of expansion than its adjacent parts, so that the increase in bearing play during operation of the engine, due in particular to the engine housing being made of a light metal alloy, can be deliberately minimized. In addition, oil flow is influenced favorably because the oil film in the bearing bore exhibits improved bearing capacity.

In order to ensure correctly functioning running properties for the crankshaft or its journal, a bearing shell made of a metallic material, steel for example, is provided between the compensating element and the crankshaft. To the extent that comparable running properties can be achieved, however, another design, for example a compensating element with a foil or the like, is also possible.

Plastic, especially high-strength thermosetting plastic, polyamide for example, is considered an especially favorable material for the compensating element. In addition, an anisotropic material must meet the requirements for the compensating element, with this material exhibiting thermal expansion that is relatively great in the radial direction and slight in the axial and tangential directions. Zinc or a zinc alloy can also possibly serve as a material for the compensating element.

The compensating element and the bearing shell form a module that can be manufactured and/or assembled from supplier parts in simple fashion and installed in the crankshaft bearing when the engine is assembled. The compensating element can be held in position by a positive fit of the bearing shell, which is U-shaped in cross section, but other configurations with a positive action are also possible. One variation involves the compensating element being connected with the bearing shell by gluing, vulcanizing, or the like. Another embodiment is one in which the compensating element is physically connected by gluing or vulcanizing with the bearing bore.

The compensating element, for example with the bearing shell as a module, is not only suitable for one-piece crankshaft bearings like those used in one-cylinder engines, but also for divided crankshaft bearings composed of a housing section of a cylinder crankcase, also called a bearing seat, and a bearing cover, e.g. a bearing bridge or a crankcase bottom. In this case the device composed of the compensating element and the bearing shell is formed by two shell-type halves inserted in the bearing bore.

Finally, the device is suitable for mounting crankshafts not only in internal combustion engines with pistons, but in piston compressors as well.

Other objects, advantages and novel features of the present invention will become apparent from the following detailed description of the invention when considered in conjunction with the accompanying drawings.

BRIEF DESCRIPTION OF THE DRAWINGS

FIGS. 3 to 10 are partial views X in FIG. 2 with various embodiments shown schematically.

DETAILED DESCRIPTION OF THE PREFERRED EMBODIMENTS

Figure 1:
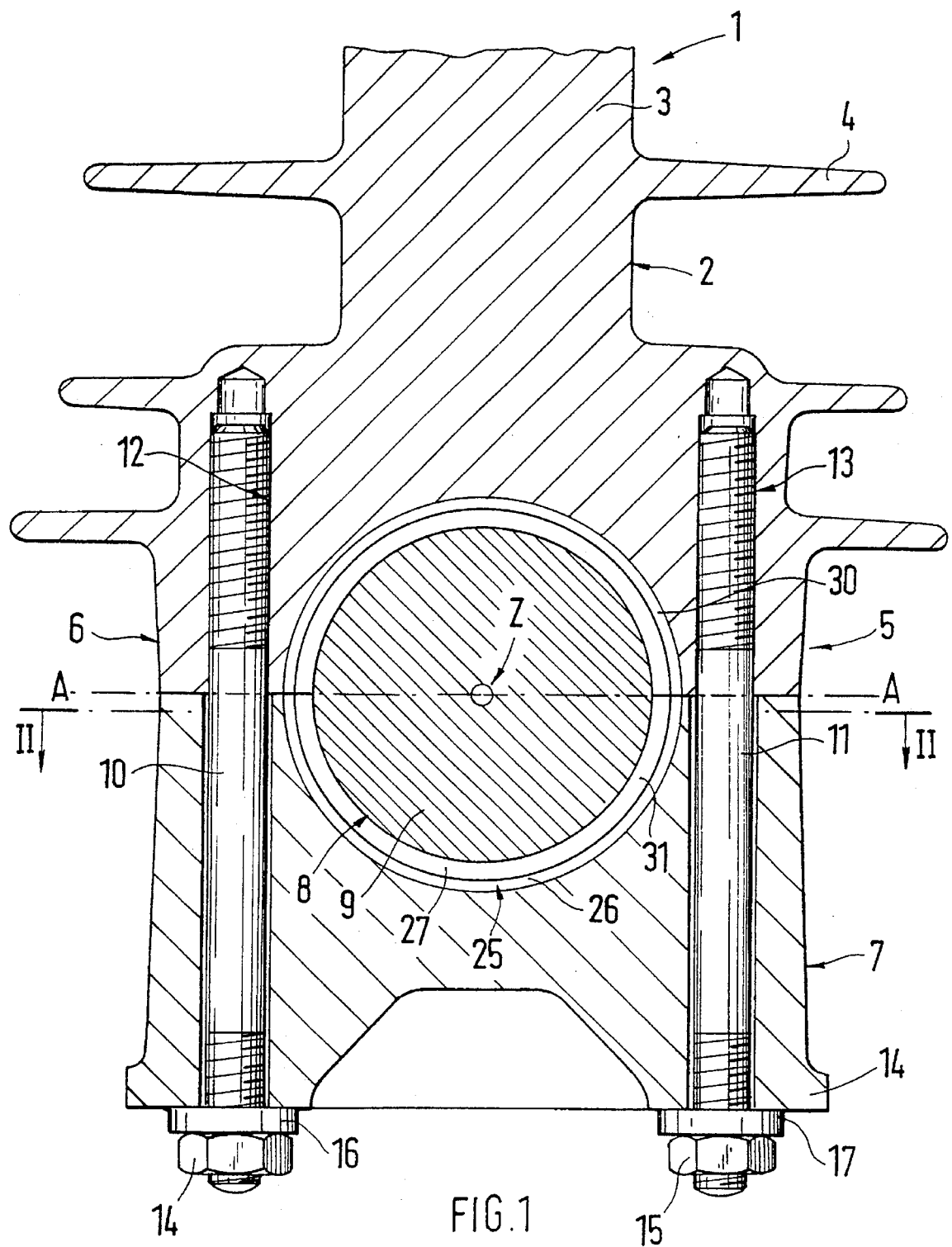
FIG. 1 is a partial cross-sectional view of an internal combustion engine in the vicinity of a crankshaft bearing with the device according to the invention.

A cylinder crankcase housing 2 made of a light metal alloy is shown, belonging to a multicylinder internal combustion engine I of the reciprocating piston type, not shown in greater detail, with one wall 3 of said crankcase extending between the cylinders, not shown in FIG. 1. A crankshaft bearing 5 is mounted on crankcase housing 2 provided with reinforcing ribs 4, said bearing being formed by a bearing section 6 manufactured in one piece with crankcase housing 2 and a bearing cover 7. Both bearing parts are assembled in a plane A—A that intersects the center Z of a crankshaft journal 9 associated with a crankshaft 8 and extending perpendicularly to the cylinder axis.

Bearing cover 7 can be a component of a bridge reinforcing crankcase 2, said bridge having several bearing covers 7 and consisting of a light metal alloy. Bridges of this kind are disclosed in German Patent Document DE-22 57 651 and European Patent Document EP-0 038 560. Bearing cover 7 is held on bearing segment 8 by means of bolts 10, 11 acting perpendicularly to plane A—A and arranged at a distance from one another, said bolts meshing with threads 12, 13 of bearing segment 6. On the free sides of bolts 10, 11, nuts 14, 15 engage to tension bearing cover 7 against bearing segment 6 with interposition of gasket rings 16, 17.

Figure 2:
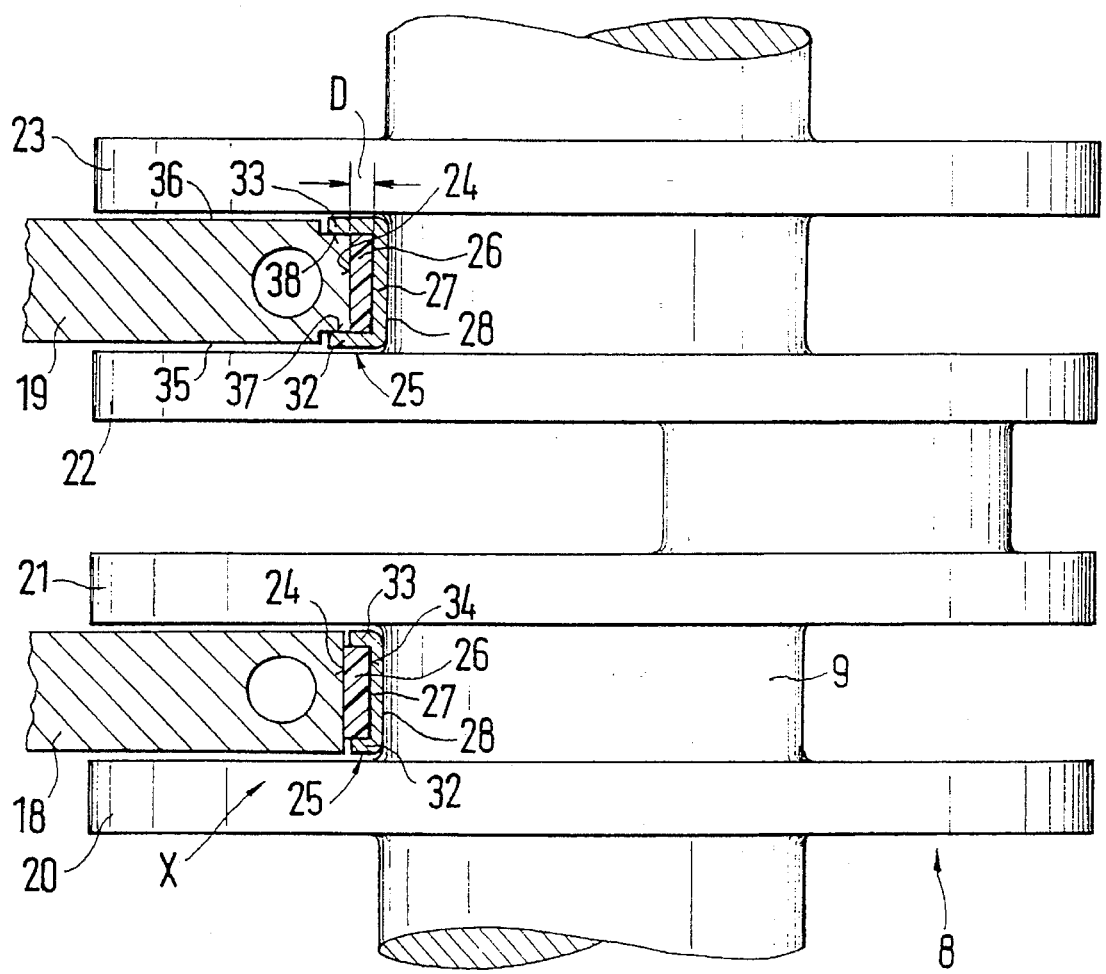
FIG. 2 is a section along line II—II in FIG. 1, but as a theoretical diagram not to scale.

In FIG. 2, bearing segment 6 and bearing cover 7 are provided on bearing seats 18, 19, extending ribwise between cheeks 20, 21 and 22, 23 of crankshaft 8.

Each bearing seat 18 or 19 is provided with a bearing bore 24 surrounding crankshaft journal 9. Between bearing bore 24 and crankshaft journal 9 a device 25 is located that contributes to controlled regulation of the increase in bearing play between bearing bore 24 and crankshaft journal 9 during the operation of the internal combustion engine.

Device 25 comprises a compensating element 26 surrounding crankshaft journal 9 annularly, said element being made of a material with a relatively high coefficient of expansion; the cross section of compensating element 26 is rectangular, but other geometric shapes or combinations of shapes are contemplated. Between compensating element 26 and crankshaft journal 9 a bearing shell 27 is provided which in the embodiment shown is made of metallic material, steel for example, and provided with a suitable run-in coating on the side facing crankshaft journal 9, designed as a running surface 28.

The following materials are suitable for the compensating element:

- ■ $w_1$: Plastic, for example high-strength thermosetting plastic; polyamide
- ■ $w_2$: Anisotropic material, for example thermosetting plastic with unidirectional fiber reinforcement —anisotropic bodies behave differently physically in different directions in space—
- ■ $w_3$: Zinc or a zinc alloy.

The choice of material and/or new development of a material is influenced significantly by mechanical, thermal, and environmental stresses on compensating element 26.

Thickness D (FIG. 2) of compensating element 26 is determined computationally/iteratively or empirically as a function of the spatial environment and the material, $w_1$, $w_2$, $w_3$. The thickness D is dimensioned so that one of the following behaviors $v_1$ and $v_2$ are achieved:

- ■ $v_1$: The bearing play between crankshaft journal 9 and device 25 remains constant with rising operating temperature of the internal combustion engine.
- ■ $v_2$: The bearing play between crankshaft journal 9 and device 25 is reduced as the operating temperature of the internal combustion engine rises.

Bearing shell 27 is a support for compensating element 26 such that the two form a type of module 29 that can be readily installed either as an annular part in a one-piece crankshaft bearing of a one-cylinder engine (see U.S. Pat. No. 4,549,510) or as a component composed of two semicircular shell halves 30, 31, in two-piece crankshaft bearing 5 as shown in FIG. 1.

According to the device 25 provided in bearing seat 18, bearing shell 27 has a U-shaped cross section that serves as a seat for compensating element 26, which is rectangular in cross section. In other words, compensating element 26 is enclosed at least partially and delimited by legs 32, 33 of the bearing shell in such fashion that it is positively held in the bearing. A film, a coating, or the like made of heat-insulating material can also be provided if desired between compensating element 26 and bearing shell 27 at 34.

In bearing seat 19, legs 32, 33 of bearing shell 27 are made sufficiently long that they surround parallel walls 35, 36 provided here locally with recesses 37, 38. Legs 32, 33 cooperate with recesses 37, 38 with slight play and compensating element 26 is completely enclosed.

FIG. 3 shows that compensating element 26 and bearing shell 27 are connected positively-by gluing, vulcanizing, or the like.

On the other hand, according to FIG. 4, bearing shell 27 is connected in the manner described above with the bearing bore of the bearing seat.

According to FIG. 5 bearing shell 27 and compensating element 26 are assembled without any positive or nonpositive connections.

It is clear from FIG. 6 that the length of legs 32, 33 of bearing shell 27 is so dimensioned that they are shorter than a supporting surface 39 of compensating element 26 extending adjacent to bearing bore 24; this is marked by distance $D_1$.

As shown in FIG. 7, bearing seat 18 has a U-shaped recess 40 in the vicinity of bearing bore 24, into which recess 40 compensating element 26 with corresponding dimensions is fitted for partial enclosure, but a supporting surface 41 projects that runs adjacent to bearing shell 27, beyond bearing bore 24; this is marked as space $D_2$.

FIG. 8 shows an embodiment in which a supporting part 42 is provided between bearing bore 24 and compensating element 26, said part having a U-shaped cross section and being made of metal, plastic, or the like.

In the embodiment according to FIG. 9, compensating element 26 consists of an anisotropic material $w_2$. This is a thermosetting plastic with unidirectional fiber reinforcement. In this example, relatively large thermal expansions occur in the radial direction r and relatively small thermal expansions occur in the axial and tangential directions a to t.

Finally, the design of device 25 is shown in FIG. 10, in which compensating element 26 is made of zinc or a zinc alloy. Both parts can either be used connected together as a module, or separately in the crankshaft bearing.

The area of application of device 25 is not limited to crankshaft bearings of single-cylinder or multicylinder internal combustion engines of the piston type. It is also possible to use them in piston compressors for example, where comparable technical requirements must be met.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Crankshaft bearing for internal combustion engines provided in a housing of the internal combustion engine that comprises a light metal alloy, comprising a bearing bore for a crankshaft journal of a crankshaft, and a bearing play reducing device, provided between a crankshaft journal and the bearing bore to thereby form a slide bearing for the crankshaft journal, said bearing play reducing device including an annular compensating element surrounding the crankshaft journal, said compensating element being made of a material with a relatively higher coefficient of thermal expansion then material of the housing and crankshaft journal.

2. Crankshaft bearing according to claim 1, wherein the device is configured for crankshaft bearings of piston compressors.

3. Crankshaft bearing according to claim 1, wherein the compensating element is made of high-strength thermosetting plastic.

4. Crankshaft bearing according to claim 3, wherein the compensating element is made of polyamide.

5. Crankshaft bearing according to claim 1, wherein the compensating element consists of an anisotropic material, in the form of thermosetting plastic with unidirectional fiber reinforcement, which anisotropic material has relatively high resistance to heat loss in the radial direction and relatively low resistance to heat loss in the axial and tangential directions.

6. Crankshaft bearing according to claim 1, wherein the compensating element consists of zinc or a zinc alloy.

7. Crankshaft bearing according to claim 1, comprising a housing section mounted on a crankcase and a bearing cover of a crankcase bottom, said section and cover, assembled in a central lengthwise plane of the crankshaft journal, being connected together by bolted connections arranged on both sides of the crankshaft journal and aligned cylindrically in the direction of the lengthwise axis, wherein the device consists of two semicircular shell halves, placed in the bearing bore.

8. Crankshaft bearing according to claim 1, wherein the thickness of the compensating element is dimensioned such that the bearing play between the crankshaft journal and the device remains constant as the operating temperature of the internal combustion engine rises.

9. Crankshaft bearing according to claim 1, wherein the thickness of the compensating element is dimensioned such that the bearing play between the crankshaft journal and the device decreases as the operating temperature of the internal combustion engine increases.

10. Crankshaft bearing according to claim 1, wherein the bearing bore has a U-shaped recess to receive the compensating element.

11. Crankshaft bearing according to claim 10, wherein one of the contact surfaces of the compensating element facing the bearing shell projects beyond the bearing bore.

12. Crankshaft bearing according to claim 1, wherein a supporting part is provided between the bearing bore and the compensating element.

13. Crankshaft bearing according to claim 12, wherein the supporting part forms a seat that is U-shaped in cross section for the compensating element.

14. Crankshaft bearing according to claim 1, wherein the compensating element is connected positively by gluing, vulcanizing, or the like with the bearing bore.

15. Crankshaft bearing according to claim 1, wherein a bearing shell is disposed between the compensating element and the crankshaft journal.

16. Crankshaft bearing according to claim 2, wherein the bearing shell is made of a metal material.

17. Crankshaft bearing according to claim 15, wherein the thickness of the compensating element is dimensioned such that the bearing play between the crankshaft journal and the device remains constant as the operating temperature of the internal combustion engine rises.

18. Crankshaft bearing according to claim 15, wherein the thickness of the compensating element is dimensioned such that the bearing play between the crankshaft journal and the device decreases as the operating temperature of the internal combustion engine increases.

19. Crankshaft bearing according to claim 15, wherein the compensating element is connected positively by gluing, vulcanizing, or the like with the bearing shell.

20. Crankshaft bearing for internal combustion engines provided in a housing of the internal combustion engine that comprises a light metal alloy, comprising a bearing bore for a crankshaft journal of a crankshaft, and a bearing play reducing device provided between a crankshaft journal and the bearing bore, said bearing play reducing device including an annular compensating element surrounding the crankshaft journal, said compensating element being made of a material with a relatively high coefficient of thermal expansion, wherein a bearing shell is disposed between the compensating element and the crankshaft journal, and wherein the bearing shell and the compensating element form a module.

21. Crankshaft bearing according to claim 20, wherein the bearing shell is designed as a support for the compensating element.

22. Crankshaft bearing according to claim 21, wherein the bearing shell is made U-shaped in cross section and forms a bearing seat for the compensating element.

23. Crankshaft bearing according to claim 22, wherein the length of legs of the bearing shell is dimensioned such that they are shorter than a supporting surface of the compensating element that runs adjacent to bearing bore.

24. Crankshaft bearing according to claim 22, wherein the bearing bore includes parallel walls, and wherein the legs of the bearing shell are so designed that they fit around the parallel walls of the bearing bore.

* * * * *